(Model.)

J. B. NEFF.
Vehicle Wheel.

No. 239,976. Patented April 12, 1881.

Witnesses:
O. W. Bond
H. F. Bruns

Inventor:
Joseph B Neff

UNITED STATES PATENT OFFICE.

JOSEPH B. NEFF, OF CUBA, ASSIGNOR TO REUBEN ELWOOD, OF SYCAMORE, ILLINOIS.

VEHICLE-WHEEL.

SPECIFICATION forming part of Letters Patent No. 239,976, dated April 12, 1881.

Application filed January 31, 1881. (Model.)

*To all whom it may concern:*

Be it known that I, JOSEPH B. NEFF, of Cuba, Fulton county, State of Illinois, have invented a new and useful Improvement in Wheels, of which the following is a full description, reference being had to the accompanying drawings, in which—

Figure 1:
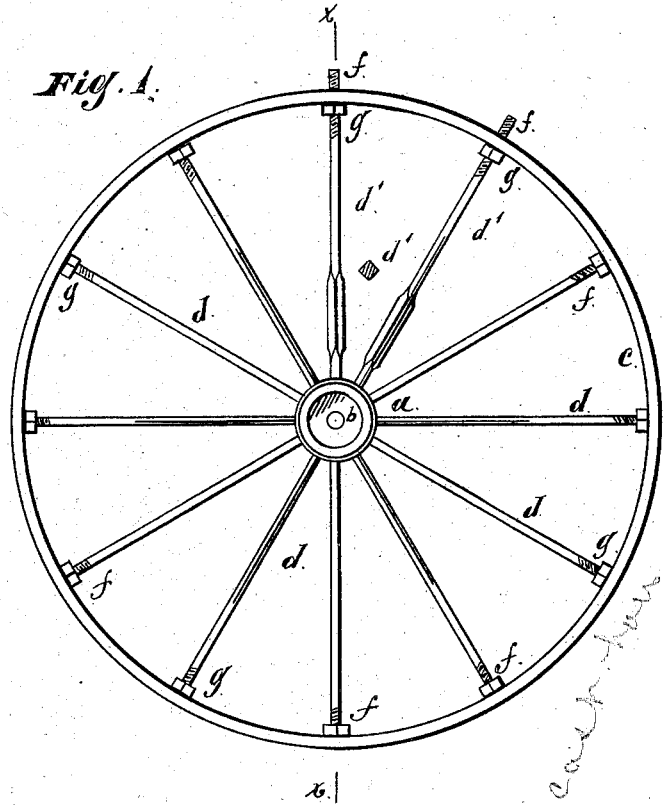
Figure 2:
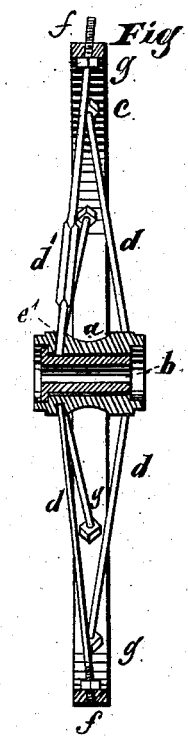
Figure 3:
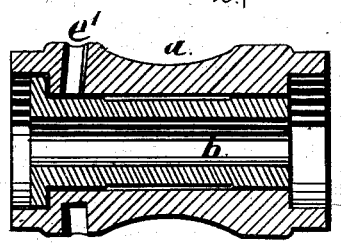
Figure 4:
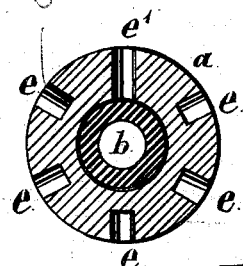

Figure 1 is a side elevation; Fig. 2, a cross-section on line $x\ x$ of Fig. 1; Fig. 3, a longitudinal section of the hub, and Fig. 4 a cross-section at one of the lines of spokes.

The object of this invention is to improve the construction of iron wheels; and its nature consists in securing the thimble in place by one or more spokes, and in securing the spokes into the tire or rim, as hereinafter more fully described.

In the drawings, $a$ indicates the hub; $b$, the thimble; $c$, the tire or rim; $d\ d'$, the spokes; $e\ e'$, the spoke-holes in the hub; $f$, the screw-threads at the ends of the spokes, and $g$ lock-nuts.

The hub $a$ is made of cast-iron, with a central opening large enough to receive the thimble $b$. This central hole or opening is enlarged at the ends, as shown at Fig. 3. The spoke-holes are cast or drilled in, and the holes $e$ do not pass quite through, while the holes $e'$ do. The spokes $d$ are made of round iron rods, and are provided with screw-threads at their outer ends. The spokes $d'$ are provided with similar but longer screw-threads, and at any suitable part along their length they are provided with an angular or flattened portion, so that an ordinary wrench may be easily applied to turn them. The spoke-holes in the tire or rim are tapped or screw-threaded, so that the spokes screw directly into the tire, which is held in place and supported by the spokes screwed therein. In this construction the nuts $g$ are not essential, as the tire or rim is not supported upon them, and is not unsupported when they are turned back or get misplaced. The nuts $g$ are used only as lock-nuts.

The wheel shown is designed mainly to be used on sulky-plows, cultivators, corn-planters, and other implements that run on or over loose earth, which is liable to be taken up by the tire so as to work into and grind out the hub rapidly. To partly obviate this difficulty the thimble $b$ is made detachable, so that it can be taken out and be replaced by a new one without sending the wheel to a shop. The thimble is made in the form shown, and the spokes $d'$, which are placed in the holes $e'$, with their inner ends resting against the thimble, and by screwing them down tightly the thimble is locked in place. By unscrewing these spokes the thimble is unlocked and can be taken out and another one inserted at any time without going to a shop. Two only of these spokes $d'$ are shown, one at each end of the hub; but it is evident that more than two can be used. When the spokes are all in place and the rim properly strained all projections beyond the tire are trimmed off.

I do not claim an iron hub or wheel, nor do I claim, broadly, spokes having screws and nuts; but the advantages of my construction of the wheel are, that the rim can be properly tightened with spokes of irregular lengths and the rim made concentric with the hub, and when surplus in the length of any of the spokes is left it projects through the rim, where it is accessible for trimming or cutting off. The spokes passing through the rim receive a portion of the thrust direct on their ends, in case a stone or other hard substance is struck, and to that extent relieve the screw-threads therefrom.

What I claim as new, and desire to secure by Letters Patent, is—

1. The hub $a$, having the holes $e\ e'$, in combination with the spokes $d\ d'$ and detachable thimble $b$, constructed and operating substantially as specified.

2. The combination of the rim $c$, having screw-threaded spoke-holes extending through it, with the hub $a$, spokes $d$, having screw-threads $f$ on their outer ends, and round hub-tenons, and the lock-nuts $g$, substantially as and for the purposes specified.

JOSEPH B. NEFF.

Witnesses:
L. L. BOND,
J. A. AYRES.